United States Patent
Anders et al.

(10) Patent No.: US 10,764,224 B2
(45) Date of Patent: Sep. 1, 2020

(54) CONVEYING ELECTRONIC MESSAGES ACCORDING TO REPRESENTATION OF EMOTION

(71) Applicant: INTERNATIONAL BUSINESS MACHINES CORPORATION, Armonk, NY (US)

(72) Inventors: Kelley Anders, East New Market, MD (US); Lisa Seacat DeLuca, Baltimore, MD (US); Jeremy A. Greenberger, San Jose, CA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 16/152,644

(22) Filed: Oct. 5, 2018

(65) Prior Publication Data
US 2020/0112533 A1    Apr. 9, 2020

(51) Int. Cl.
*H04L 12/58* (2006.01)
*H04L 29/08* (2006.01)
*G06F 9/54* (2006.01)
*G06F 3/0481* (2013.01)

(52) U.S. Cl.
CPC .............. *H04L 51/24* (2013.01); *G06F 9/542* (2013.01); *H04L 67/26* (2013.01); *G06F 3/04817* (2013.01)

(58) Field of Classification Search
CPC ......... H04L 51/24; H04L 67/26; G06F 9/542; G06F 3/04817
See application file for complete search history.

(56) References Cited

U.S. PATENT DOCUMENTS

| | | | |
|---|---|---|---|
| 7,983,701 B2 * | 7/2011 | Bell | H04M 1/72552 455/403 |
| 8,059,807 B2 | 11/2011 | Gilbert et al. | |
| 2010/0125811 A1 * | 5/2010 | Moore | G06F 3/0482 715/846 |
| 2015/0288640 A1 | 10/2015 | Lee | |
| 2016/0127282 A1 * | 5/2016 | Nezarati | G06F 3/0481 715/758 |
| 2016/0352667 A1 * | 12/2016 | Pickett | H04L 67/22 |
| 2018/0109639 A1 * | 4/2018 | Skillman | G06F 3/0482 |
| 2018/0217968 A1 * | 8/2018 | Bastide | G06F 40/30 |
| 2019/0253378 A1 * | 8/2019 | Gu | H04M 1/72547 |

OTHER PUBLICATIONS

Davis, Mark; Unicode Technical Standard #51, Unicode Emoji; unicode.org, "Unicode Emoji: Section 7, Searching." http://unicode.org/reports/tr51/#Searching; retrieved from the Internet Accessed Mar. 28, 2018; 35 pages.
Greene, Oscar; Using Clack—Set up keyword notifications; URL: https://get.slack.help/hc/en-us/articles/201398467-Set-up-keyword-notifications; retrieved from the Internet Accessed Mar. 28, 2018; 1 page.

* cited by examiner

*Primary Examiner* — Arvin Eskandarnia
(74) *Attorney, Agent, or Firm* — Schmeiser, Olsen & Watts; Michael P. O'Keefe

(57) ABSTRACT

A processor-executed method for conveying an electronic message according to a representation of an emoticon comprises mapping an emoticon to a type of notification of interest to a community of computer users; determining one or more recipient users of the community of computer users for receiving a notification when the emoticon is transmitted with the electronic message; and transmitting the notification to the one or more recipient users of the community of computer users.

20 Claims, 7 Drawing Sheets

CONVEYING ELECTRONIC MESSAGES ACCORDING TO REPRESENTATION OF EMOTION

BACKGROUND

The present invention relates to electronic communication processing, and more specifically to the propagation of digitized reactions representing an emotion or sentiment to a group of predetermined recipients.

Modern messaging services permit users to add "reactions" to electronic communications between users that are in the form of emotion icons, or "emoticons" or other electronically displayed hieroglyphics or pictorial icons that display an emotion or sentiment. For example, team messaging tools allow a recipient of a message to select an emoticon or the like in response to a message. However, such messaging tools currently do not provide the recipient's reaction in the form of a response with a corresponding emoticon to be sent to other relevant users who should also be informed of the electronic message exchange in view of the selected emoticon.

SUMMARY

An embodiment of the present invention relates to a processor-executed method for conveying an electronic message according to a representation of an emoticon, comprising: mapping an emoticon to a type of notification of interest to a community of computer users; determining one or more recipient users of the community of computer users for receiving a notification when the emoticon is transmitted with the electronic message; and transmitting the notification to the one or more recipient users of the community of computer users.

Another embodiment of the present invention relates to a processor-executed method for exchanging electronic messages using a messaging tool or service, comprising: subscribing by a community of computer users to the messaging tool or service; requesting an alert by one or more users of the community of computer users when at least one emoticon is used in an electronic message exchange using the messaging tool or service; posting by a sending user an electronic message to a channel using the messaging tool or service; responding to the electronic message by a second user including an emoticon; determining that that emoticon is among the at least one emoticon; and determining which of the one or more users is to receive a notification of the electronic message exchange based on the requested alert of the at least one emoticon.

Another embodiment of the present invention relates to a computer system, comprising: a processor; a memory device coupled to the processor; one or more remote computer servers in communication with the processor; and a computer readable storage device coupled to the processor, wherein the storage device contains program code executable by the processor via the memory device to implement a method for conveying an electronic message according to a representation of an emoticon, comprising: mapping an emoticon to a type of notification associated with a community of computer users; determining one or more users of the community of computer users for receiving a notification when the emoticon is transmitted with the electronic message; and transmitting the notification to the one or more users of the community of computer users that the emoticon is used in the electronic message.

Another embodiment of the present invention relates to a computer program product, comprising a computer readable hardware storage device storing a computer readable program code. The computer readable program code comprises an algorithm that when executed by a computer processor of a computer system implements a method for conveying an electronic message according to a representation of an emoticon, comprising: computer readable program code for mapping an emoticon to a type of notification associated with a community of computer users; computer readable program code for determining one or more users of the community of computer users for receiving a notification when the emoticon is transmitted with the electronic message; and computer readable program code for transmitting the notification to the one or more users of the community of computer users that the emoticon is used in the electronic message.

DETAILED DESCRIPTION

In brief overview, systems and methods in accordance with embodiments of the present invention are provided that incorporate reactions embodied as an emoticon into an electronic message that is received by the personal computing devices of people who need, or desire, to be alerted of the messages due to the emoticon in the message. Although emoticons are described, other electronically displayed hieroglyphics or pictorial icons may equally apply such as emoji.

Figure 1:
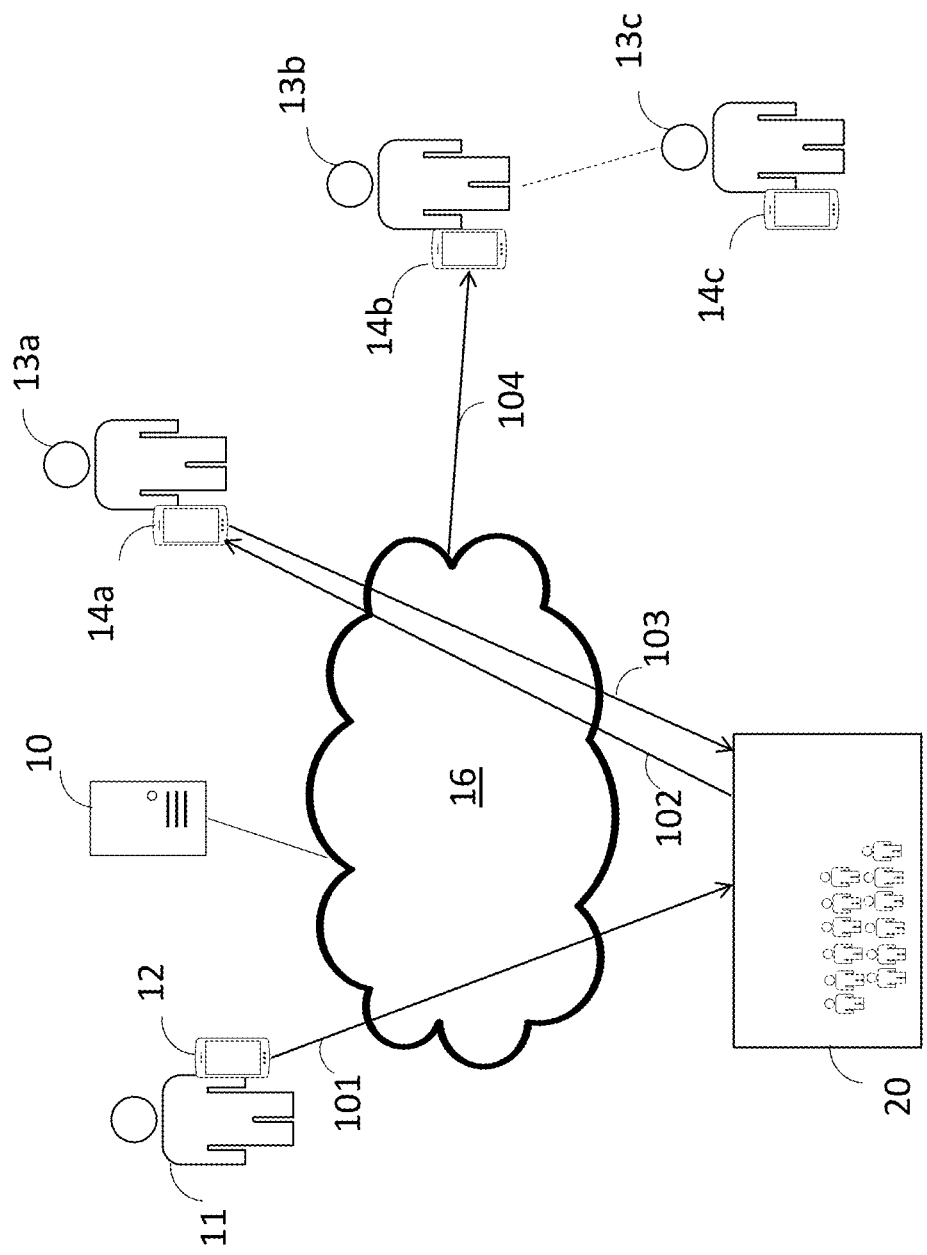
FIG. 1 is a network diagram illustrating data flow paths between computing elements of an environment in which embodiments of the present invention are practiced.

FIG. 1 is a network diagram illustrating data flow paths between computing elements of an environment in which embodiments of the present invention are practiced. A notification system 10 electronically coupled to a network 16 is configured to monitor data exchanges represented by the flow paths between the personal computing device 12 of a sending user 11 and the personal computing devices 14a, 14b, 14c of recipient users 13a, 13b, 13c, respectively. Although three personal computing devices 14a, 14b, 14c (generally, 14) and recipient users 13a, 13b, 13c (generally, 13) are depicted for illustrative brevity, in alternate embodiments, a different number of personal computing devices 14 and/or recipient users 13 may be present.

In some embodiments, the notification system 10 is executed by a standalone computer in electronic communication with the network 16. In other embodiments, the notification system 10 is part of a messaging service or online tool or the like such as the Slack® team messaging service.

An electronic message may be output via data flow path 101 from the personal computing device 12 of the sending user 11. The electronic message can be any data communication exchanged between computing devices, for example, via a network 16, and that can be posted, stored, or otherwise displayed for viewing and reaction by one or more other recipient users 13. The network 16 provides data exchange paths, e.g., shown in FIG. 1, which provide for the transfer, routing, or other exchange of an incoming communication from the personal computing devices 12, 14. Examples of a communication network 16 may include, but are not limited to, a public switched telephone network (PSTN) (e.g., an analog landline network of telephones, a cellular network for mobile devices, or communication satellites), a wireless network, a data communication network, e.g., a local area network (LAN) or a wide area network (WAN), or a combination thereof. Although a communication network 16 is referred to throughout the figures, the computing devices 12, 14 may exchange data directly with each other, for example, via a Bluetooth® connection.

One example of an electronic message is an email message. Another example of an electronic message is a team messaging communication of a cloud-based team collaboration tool. Yet another example is an incoming short message service (SMS) text message. In some embodiments, the electronic message is posted to a group communication channel 20, which can include an online chat room, discussion forum, or social network community, but not limited thereto. Some or all personal computing devices 12, 14 can be mobile electronic devices such as smartphones, laptops, electronic notebooks, desktop computers, or other computers having a display and other peripheral devices allowing the sending user 11 to engage in electronic communications with other users 13. The sending user 11 may be part of a team, group, or other organization that engages with other members of the organization via computer data exchanges, such as the message output 101 from the sending user's computing device 12. In some embodiments, potential recipient users 13 may select emoticons. The system 10 may execute a triggered push notification or the like for the potential recipient users 13.

In some embodiments, a threshold trigger is provided to push an emoticon. For example, a rule may be established, and electronically stored, that an information technology (IT) group uses an image of a flame as an emoticon for high severity computer problems, followed by an emoticon of a fire extinguisher understood by a viewer that the problem is being addressed. The user can see both emoticons. Here, a threshold trigger is reached because the two emoticons together indicate that there is a plan for closure, and that a message can be delivered with the emoticons as an update to a user, so that the user understands that there is a computer problem but that it is being addressed.

Data flow path 102 illustrates receipt of the message by a recipient user 13a of one or more community of users, for example, a workgroup, organizational gathering, or other group with access to channel 20, and who has a common understanding of the emoticon according to the other community members. For example, the recipient user 13a can retrieve the message from the channel 20 or receive the message from the sending user 11 as part of a distribution of message recipients.

Data flow path 103 illustrates a response by the recipient user 13a, who can express an emotion or sentiment by adding emoji buttons or related emoticons to the message.

Data flow path 104 illustrates a data communication with another recipient user 13b who is part of the same community as the first recipient user 13a, and who recognizes the emoticon output from the recipient user 13a as having the same meaning as that recognized by the other recipient user 13b based on the particular community to which both recipient users 13a, 13b belong. The system 10 determines which recipient users in the predefined group to also output an alert, notification, or the like regarding the shared message upon completion of the sending user 11 posting the message based on the reactions to the emoticon and subscription preferences provided by the other users, for example, recipient user 13c. For example, the other recipient user 13b receives a notification or alert that may include a message displayed at the user's personal computing device 14b with information regarding the second user's response, the sending user's initial message, or both. In some embodiments, the displayed message at the personal computing device 14b includes a pop-up display or the like that displays the notification, alarm, and/or contents of the data exchange between the sending user 11 and the first recipient user 13a. In some embodiments, in response to a selection of another emoticon, this information can be stored for future use by the notification system 10, which can learn about the evolving or changing interpretation by users of various emoticons.

In some embodiments, the notification system 10 permits a computer user who is not part of a particular group to nevertheless receive electronic communications in response to an identified emoticon. For example, referring to the dancing banana emoticon illustrated in FIG. 2, each member of a sales organization may receive a message when the dancing banana emoticon is attached to the message submitted by the sending user 11. The other recipient user 13b may be a company executive who is not a member of the group, and who wishes to receive alerts or notifications associated with the dancing banana emoticon even though the company executive was not part of a preselected distribution of recipients for receiving the initial message from the sending user 11 in FIG. 1.

In another example, a listing of suggested emoticons may be presented on a user's display of the personal computing device 14 when a user 13 receives a message and has an opportunity to respond.

Figure 2:
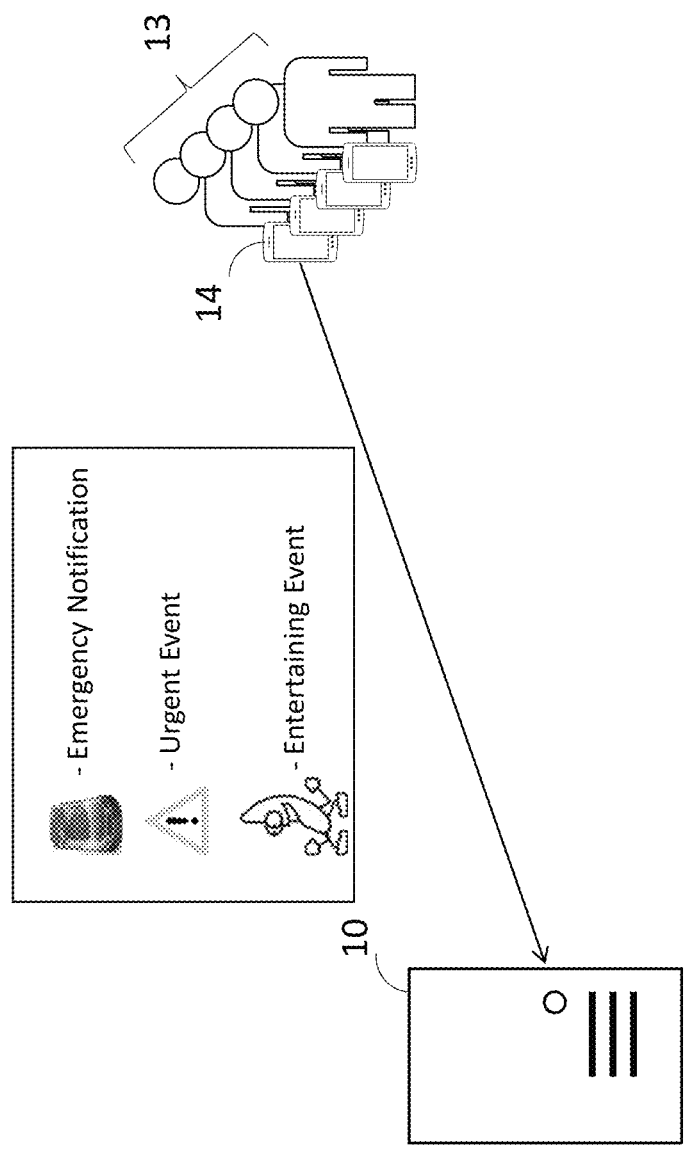
FIG. 2 is an illustration of a community of users associating various emoticons with meanings understood by the users, in accordance with some embodiments.

FIG. 2 is an illustration of a community of users 23 mapping various emoticons with particular emotions defined by the user, in accordance with some embodiments. The users 23 may be a combination of sending and recipient users, for example, similar to or the same as sending user 11 and recipient users 13 in FIG. 1. For example, the users 23 may be part of a company's sales organization. It is understood to the users 23 in this example that an emoticon of a red light is indicative of an emergency notification. Therefore, when the image of the red light is appended to a message by one of the users 23, all of the other users in the community recognize the importance of the message. Similarly, the users 23 in this example recognize urgent event and entertaining event emoticons. These emoticons, however, may have different meanings by other communities, such as an engineering group, an ambulance service, a police department, and so on. Referring again to step 104 of FIG. 1, these example emoticons may be provided as part of an alert or notification if one of the recipient users 13 selects the emoticon in response to a message submitted by the sending user 11. In other cases, emoticons may be unique and personal to a user within the group of users 23. The notification system 10 can distinguish such unique and personal emoticons from publicly used and commonly shared emoticons as shown in FIG. 2

In some embodiments, an electronic mapping of emoticons prior to the data flow exchange shown in FIG. 1 may be provided. For example, each person using the system 10 may have a personal preference on emoticons that he or she enjoys using, and which emoticons the person wishes to be alerted about when such emoticons are posted as part of a message to a group communication channel 20. The system 10 here may store a personal user corpus of unique emoticons per user. The manner in which notification triggering is executed may also be unique to each user.

Figure 3:
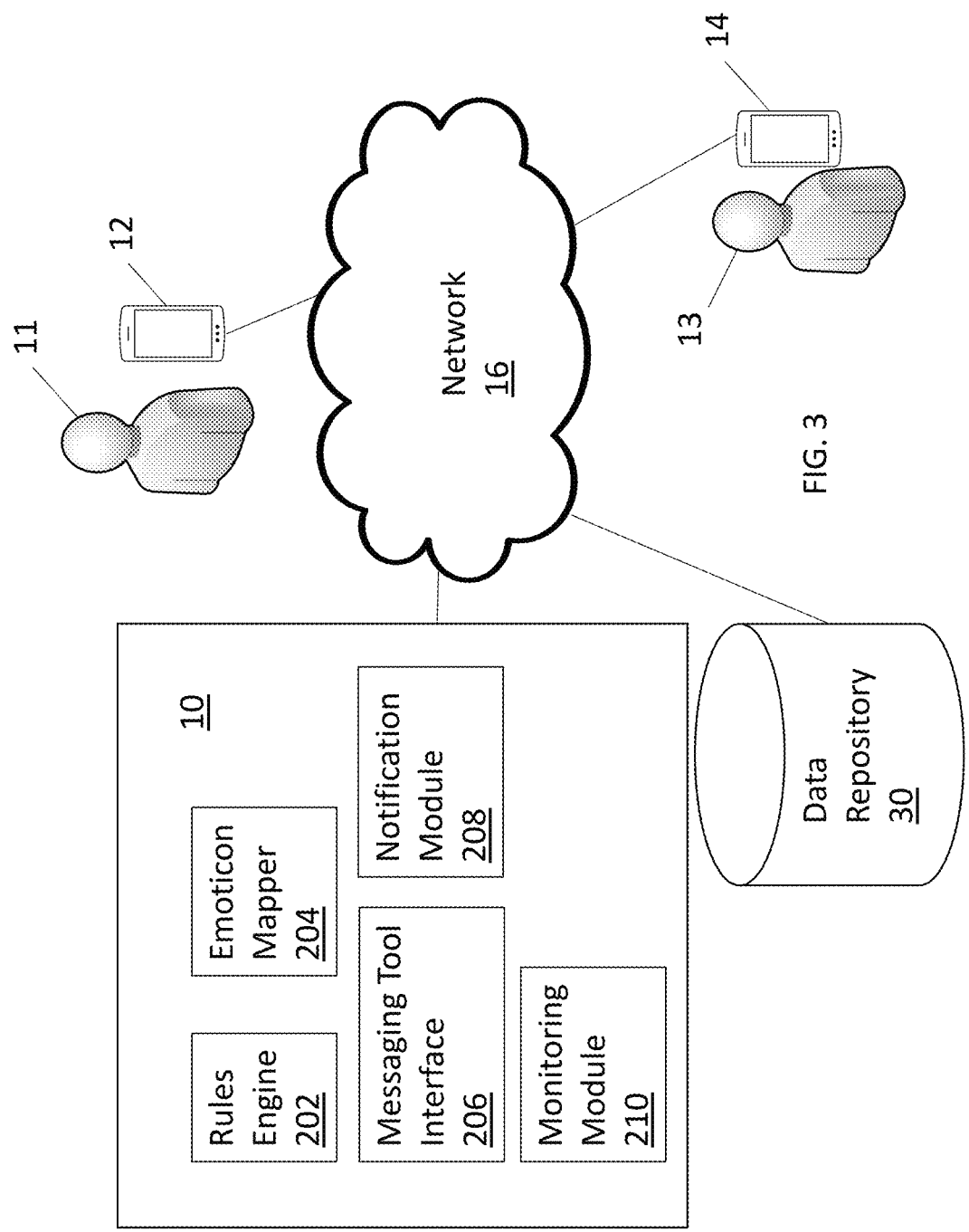
FIG. 3 is a diagram of a computing environment in which a notification system operates, in accordance with embodiments of the present invention.

FIG. 3 is a diagram of a computing environment in which the notification system 10 of FIGS. 1 and 2 operates, in accordance with embodiments of the present invention.

As shown in FIG. 3, in some embodiments, the notification system 10 includes a rules engine 202, an emoticon mapper 204, a messaging tool interface 206, and a notification module 208. Some or all of these elements of the notification system 10 can be co-located at a computer server or other special-purpose hardware computer, or stored and executed at remote computers such as a computer of a messaging service, and in communication with the network 16.

Figure 4:
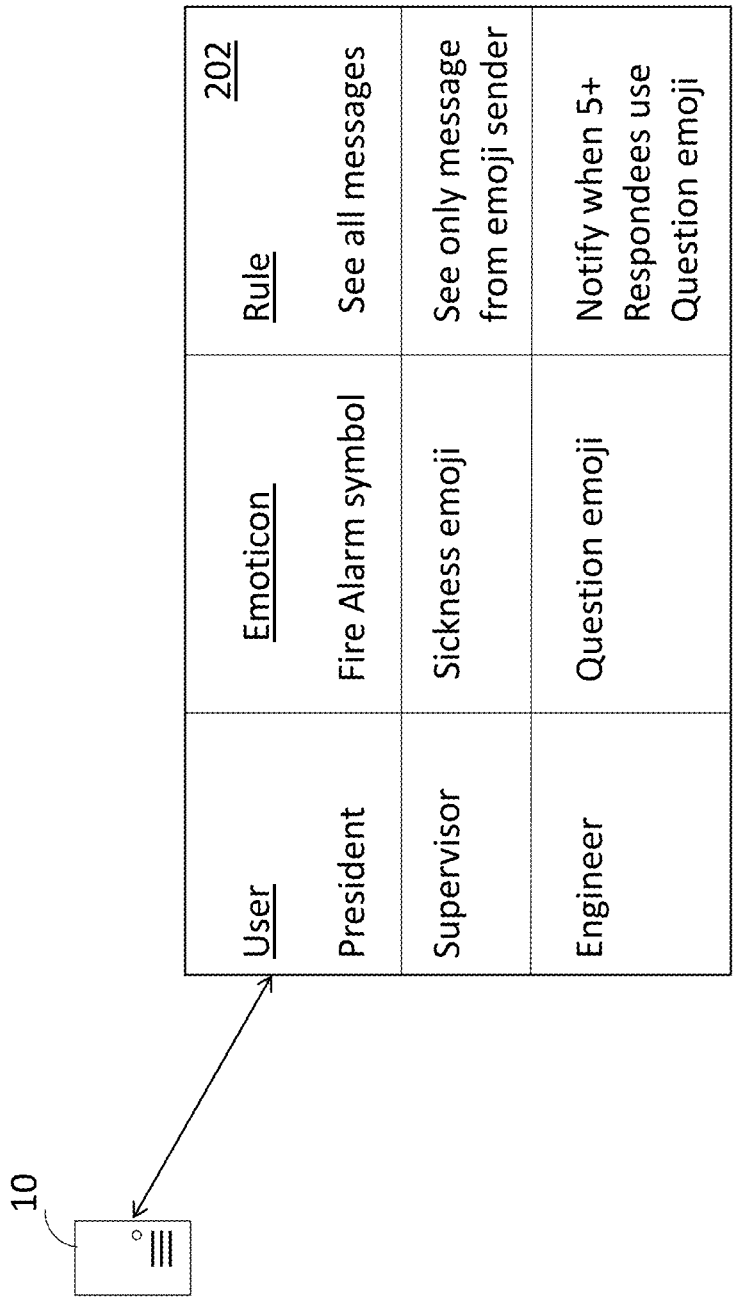
FIG. 4 is a diagram illustrating a rules engine executing a data exchange between user personal computing devices and the notification system of FIGS. 1-3, in accordance with embodiments of the present invention.

The rules engine 202 is constructed and arranged to process user-specific criteria with respect to emoticons of interest. For example, also referring to FIG. 4, the rules engine 202 is constructed and arranged to receive and electronically store user-specific preferences regarding the management of emoticons and actions to be taken in response to the identification of emoticons.

For example, a first rule may be established for a president of a company who wishes to receive all messages associated with a fire alarm symbol that is well-understood as indicating an emergency-related event. Accordingly, the president may receive a message when a fire alarm symbol is concatenated to the message posted by an employee at a group communication channel. A second rule may be established for a supervisor who wishes to receive any messages including a sickness emoji posted by a subordinate. A third rule may be established for an engineer who is a member of a group who recognizes an emoji including a question mark who wishes to receive messages from other engineers in a group when at least five responses use the question mark emoji in a message exchange. The company president, supervisor, and engineer may be examples of recipient users 13 described in FIG. 1.

The rules engine 202 can process preferences, thresholds, or other criteria that are set for using emoticons and/or combinations of emoticons and words. In doing, a message is posted at a channel or data repository. In some embodiments, the system may analyze the overall context and emoticon data and in response automatically apply a predetermined message that corresponds to the known interpretation of an emoticon. For example, a message may be posted as follows: "This needs urgent management attention required for the entire team to work this Severity 1 problem." An emoticon of a flame may be added to this message indicating to a reader that the message is very important, or "hot." The rules engine 202 may establish that the addition of text regarding the need for management attention in combination with multiple emoticons may trigger the system to further expand the distribution list to also add the management team members identified. The rules engine 202 and baseline of known behavior may permit the system 10 to associate the addition of certain words and then match emoticons with the additional words to trigger an event for notifications.

The emoticon mapper 204 can manage a mapping table that associates emoticons with users. For example, referring by way of example to FIG. 1, recipient user 13a may preselect emoticons of interest so that the system 10 automatically recognizes the emoticons of interest relative to the recipient user 13a, and can also associate the recognized emoticons with other users 13b, 13c in the same community as the recipient user 13a. In some embodiments, some users may select an emoticon previously associated with a well-known emotion, for example, a crying face emoji, to instead be associated with happy events, for example, illustrating happiness, i.e., tears of joy, instead of sadness. Therefore, the notification system 10 when processing communication exchanges may identify users who may be candidates for receiving messages associated with particular emoticons. Data regarding a change in meaning of the emoticon can be stored by the emoticon mapper 204, which can function as a lexicon processor, and can therefore be used by the system to identify other users for sharing a message, or receiving a notification of a message upon a reaction including an emoticon by a user.

In addition, the emoticon mapper 204 can associate defined emoticon meanings that vary from community to community. Here, the system 10 is configured to store and process personal preferences for understanding the overall personal preferences of the unique meaning that are personal to that user. For example, if a user has a personal profile including a particular mapping scheme, this information may be retrieved by the system 10, which can learn from this mapping scheme in order to associate emoticons with previously unidentified emotions or sentiments from the mapping scheme.

The messaging tool interface 206 provides a communication path via the network 16 between the notification system 10 and a messaging tool, which facilitates message exchanges between sending user 11 and one or more recipient users 13. In particular, the messaging tool interface 206 monitors messages to determine if they include emoticons, and retrieves and processes the emoticons to perform a system operation according to some embodiments.

The notification module 208 is configured to generate a notification, for example, an alert, for output to those users 13 identified according to a particular emoticon of interest. Predetermined notifications can be stored in and retrieved from a database or related data repository 30. Emoticons can be mapped to a type of notification and stored at the data repository 30, for example, flame emoticons mapped to important alerts.

Referring by way of example to FIG. 1, a notification can be generated for output to recipient user 13a who receives a popup window displayed that includes a message that recipient user 13b previously responded to the same message with a particular emoticon, which informs recipient user 13a of the emotion, sentiment, or intent of recipient 13b with respect to the message.

In some embodiments, the notification module 208 outputs emoticons used by other users in various messages that are determined to be of interest. For example, user 13b may receive for viewing an emoticon used by sending user 11 in a message as well as an emoticon submitted in a response message sent by recipient user 13a, which may be the same as or different than the emoticon sent in the message from user 11. In addition or alternative to alerting the specific users being targeted for a communication, the notification module 208 can alert a group of users who commonly use an emoticon, for example, determined from stored historical data and/or information stored at the data repository 30 and collected by the notification system 10.

As previously described, a notification can be transmitted that includes prompting users with a suggested emoticon. For example, recipient user 13*a* may react to a message sent by sending user 11 by first receiving a suggested emoticon to use to "alert the right people." Here, recipient user 13*a* can select the suggested emoticon whereby recipient user 13*b* automatically receives an alert. For example, a team leader may desire for the entire support team to view messages that are deemed "urgent." Here, the message may include a flame emoticon. The team leader may wish to add the flame emoticon to the message which is added to and/or triggers a push notification. Also, the team leader may not wish for other people to be alerted to this message, so these people will not receive the push notification.

Figure 5:
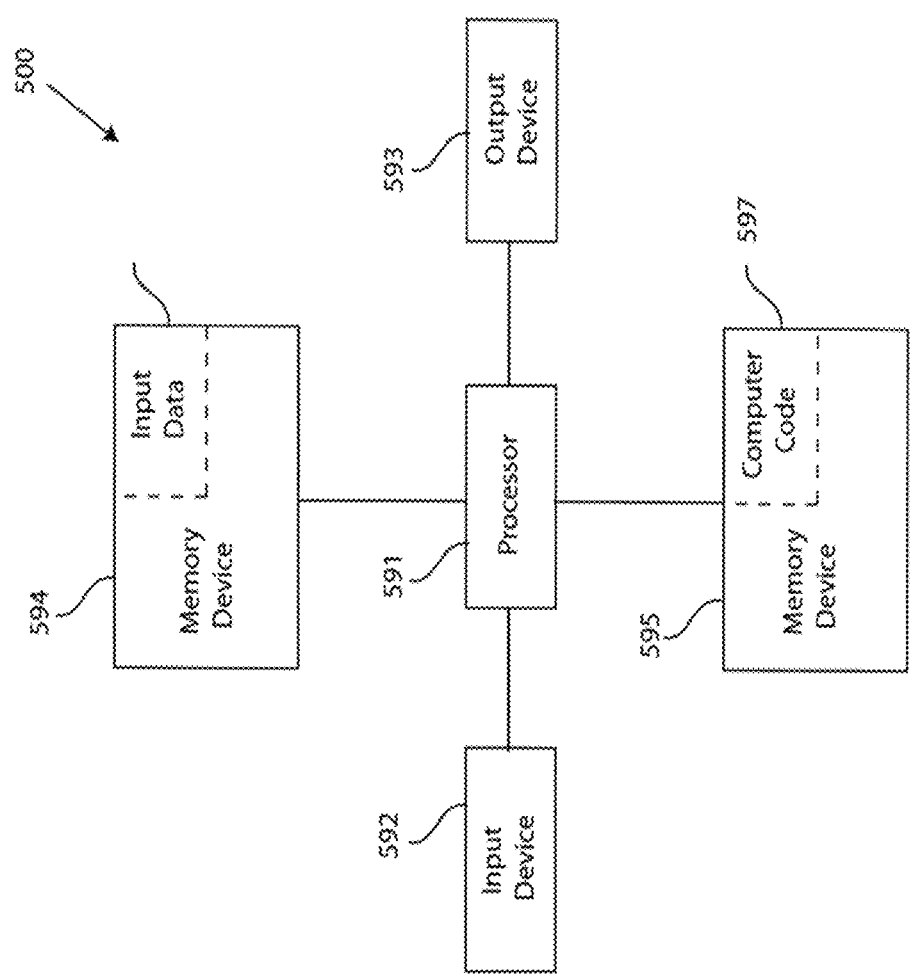
FIG. 5 illustrates a block diagram of a computer system capable of implementing a method for conveying electronic messages according a representation of emotion, sentiment, or the like, in accordance with embodiments of the present invention.

FIG. 5 illustrates a block diagram of a computer system 500 that may be included in the system of FIG. 1 and the methods illustrated in FIGS. 2 and 3 in accordance with embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing embodiments of a method, in the manner prescribed by one or more elements of the system and methods described with respect to FIGS. 1-4, wherein the instructions of the computer code 597 may be executed by processor 591 via memory device 595. The computer code 597 may include software or program instructions that may implement one or more algorithms for implementing the methods of providing a result, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository, for example, part of one or more elements of the computing architecture as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to cognitive computer systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a process according to embodiments of the present invention. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method according to embodiments of the present inventive concepts.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform processes according to embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
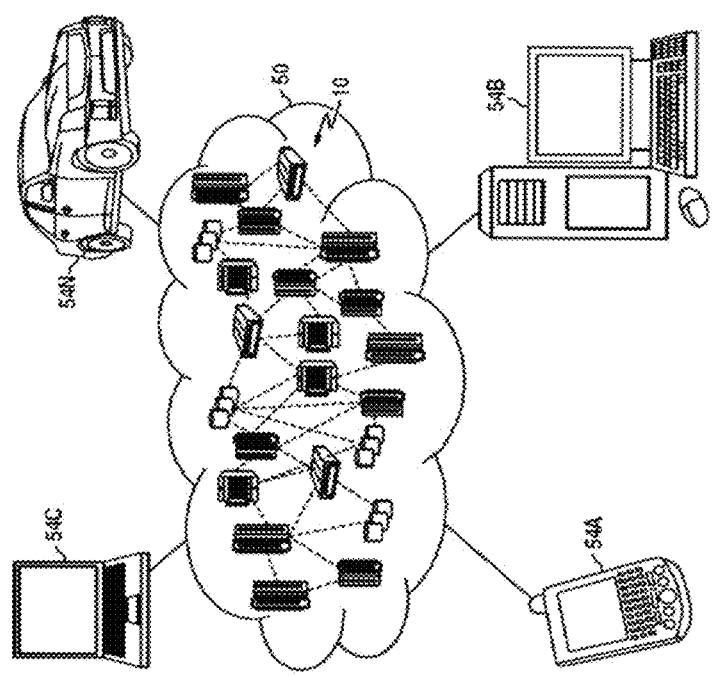
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
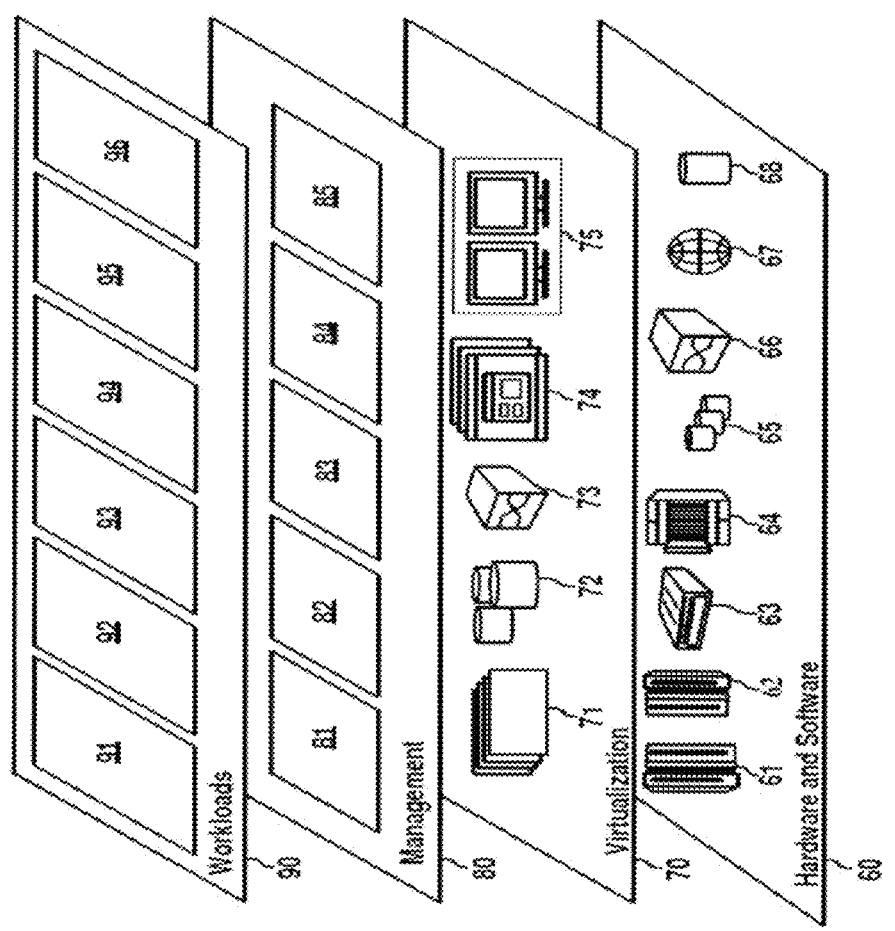
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API management or the like 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A processor-executed method for conveying an electronic message according to a representation of an emoticon, comprising:

defining by a plurality of computer users an interpretation of a plurality of emoticons;

receiving an electronic message accessible to the plurality of computer users;

receiving a response to the electronic message including an emoticon of the plurality of emoticons;

determining one or more recipient users of the community of computer users for receiving a notification when the emoticon is transmitted with the response to the electronic message including determining a match between the emoticon transmitted with the response and an interpreted emoticon of the plurality of emoticons defined by the other recipient users; and transmitting the notification to the one or more recipient users of the community of computer users when the emoticon transmitted with the response is recognized by the one or more recipient users based on the defined interpretation of the emoticon.

2. The method of claim 1, wherein the type of notification includes an alert.

3. The method of claim 1, further comprising: mapping each emoticon of the plurality of emoticons to a type of notification of interest, comprising:

subscribing by each of the community of computer users to a data repository that associates each of a plurality of emoticons to the interpretations of the emoticons defined by the computer users; and mapping the emoticon of the plurality of emoticons according to the interpretation of the emoticon.

4. The method of claim 1, wherein the emoticon is selected from one of a plurality of emoticons provided to a sender of the electronic message.

5. The method of claim 1, further comprising:

setting a preference or threshold for using the emoticon; and modifying a stored listing of the community of computer users according to the preference or threshold.

6. The method of claim 5, further comprising:

executing a rules engine to associate additional contents of the electronic message; and matching the emoticon with the additional contents to initiate a triggering of an event notification.

7. The method of claim 6, wherein the event notification includes a triggered push notification.

8. The method of claim 1, further comprising: analyzing a combination of emoticons and words.

9. The method of claim 1, further comprising changing the mapping of the emoticon to a different meaning of the emoticon.

10. The method of claim 1, further comprising:

storing a use or selection of a different emoticon; and adding the different emoticon and meaning to the mapping of the emoticon.

11. The method of claim 1, further comprising transmitting the notification to a recipient user who is external to the community of computer users.

12. A processor-executed method for exchanging electronic messages using a messaging tool or service, comprising:

subscribing by a community of computer users to the messaging tool or service;

requesting an alert by one or more users of the community of computer users when at least one emoticon is used in an electronic message exchange using the messaging tool or service;

posting by a first user an electronic message of the electronic message exchange to a channel using the messaging tool or service;

responding to the electronic message by a response of the electronic message exchange sent by a second user, the response including an emoticon;

determining that the emoticon of the response is among the at least one emoticon; and determining which of the one or more users is to receive a notification of the electronic message exchange based on the requested alert.

13. The method of claim 12, further comprising defining by the community of computer users an interpretation of the at least one emoticon including mapping the at least one emoticon to a type of notification associated with the community of computer users, and wherein subscribing by the community of computer users to the messaging tool or service includes subscribing the community of computer users to a database that associates a plurality of emoticons to a meaning according to the interpretation of the at least one emoticon.

14. The method of claim 12, further comprising:
setting a preference or threshold for using the emoticon; and
modifying a stored listing of the community of computer users according to the preference or threshold.

15. The method of claim 14, further comprising:
executing a rules engine to associate additional contents of the electronic message; and
matching the emoticon with the additional contents to initiate a triggering of an event notification.

16. The method of claim 15, wherein the event notification includes a triggered push notification.

17. The method of claim 12, further comprising:
storing a use or selection of a different emoticon; and
adding the different emoticon and meaning to the mapping of the emoticon.

18. A computer system, comprising:
a processor;
a memory device coupled to the processor;
one or more remote computer servers in communication with the processor; and
a computer readable storage device coupled to the processor, wherein the storage device
contains program code executable by the processor via the memory device to implement a method for conveying an electronic message according to a representation of an emoticon, comprising:
defining by a plurality of computer users an interpretation of a plurality of emoticons;
receiving an electronic message accessible to the plurality of computer users;
receiving a response to the electronic message including an emoticon of the plurality of emoticons;
determining one or more recipient users of the community of computer users for receiving a notification when the emoticon is transmitted with the response to the electronic message including determining a match between the emoticon transmitted with the response and an interpreted emoticon of the plurality of emoticons defined by the other recipient users; and
transmitting the notification to the one or more recipient users of the community of computer users when the emoticon transmitted with the response is recognized by the one or more recipient users based on the defined interpretation of the emoticon.

19. The computer system of claim 18, further comprising: mapping each emoticon of the plurality of emoticons to a type of notification associated with a community of computer users comprises subscribing by each of the community of computer users to a database that associates the plurality of emoticons to a meaning defined by the computer users.

20. The computer system of claim 18, wherein the program code executable by the processor via the memory device to implement a method for conveying an electronic message including an emoticon further comprises:
storing a use or selection of a different emoticon; and
adding the different emoticon and meaning to the mapping of the emoticon.

* * * * *